(12) United States Patent
Boettcher et al.

(10) Patent No.: US 12,106,023 B2
(45) Date of Patent: Oct. 1, 2024

(54) MODELING NEW DESIGNS FOR ELECTROMAGNETIC EFFECTS

(71) Applicant: The Boeing Company, Chicago, IL (US)

(72) Inventors: Philipp Andreas Boettcher, Golden, CO (US); Derek R. Tuck, Charleston, SC (US); Louisa Michael, Charleston, SC (US); Brian Patrick Justusson, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 666 days.

(21) Appl. No.: 17/459,316

(22) Filed: Aug. 27, 2021

(65) Prior Publication Data
US 2023/0062266 A1 Mar. 2, 2023

(51) Int. Cl.
*G06F 30/23* (2020.01)
*G06F 30/15* (2020.01)
*G06F 111/10* (2020.01)

(52) U.S. Cl.
CPC .............. *G06F 30/23* (2020.01); *G06F 30/15* (2020.01); *G06F 2111/10* (2020.01)

(58) Field of Classification Search
CPC ....... G06F 30/23; G06F 30/15; G06F 2111/10
See application file for complete search history.

(56) References Cited

FOREIGN PATENT DOCUMENTS

CN 112329149 A * 2/2021 ............. G06F 30/15

OTHER PUBLICATIONS

Gharghabi P. Experimental and numerical studies of lightning strike induced damage to carbon fiber epoxy composites. Mississippi State University; 2018. (Year: 2018).*
Apra M, D'Amore M, Gigliotti K, Sarto MS, Volpi V. Lightning indirect effects certification of a transport aircraft by numerical simulation. IEEE Transactions on Electromagnetic Compatibility. Aug. 2008;50(3):513-23. (Year: 2008).*
Guadalupe Gutierrez Gutierrez et al,Finite-difference time-domain method applied to lightning simulation and aircraft certification process, EMC Europe 2011 York, IEEE, Sep. 26, 2011, pp. 750-755.

(Continued)

*Primary Examiner* — Chuen-Meei Gan
(74) *Attorney, Agent, or Firm* — Quinn IP Law

(57) ABSTRACT

A method for modeling a new design for electromagnetic effects includes identifying, with a model based system engineering tool, an area of interest in the new design where a lightning strike may occur. The new design includes structural features and electromagnetic features. The method further includes generating, with an electromagnetic effects solver tool and a structural solver tool, a design model for the area of interest in the new design, extracting design parameters from the design model, and generating a reduced order model by processing the design parameters, test results, and simulation results with a modeling tool. The reduced order model couples the structural features with the electromagnetic features. The test results are determined by tests of known designs. The simulation results are determined by simulations of known models. The method further includes storing the reduced order model in a storage medium that is readable by a statistical modeling tool.

20 Claims, 9 Drawing Sheets

(56) References Cited

OTHER PUBLICATIONS

John C. Corbin et al, Assessment of Aircraft Susceptibility/Vulnerability to Lightning and Development of Lightning-Protection Design Criteria, IEEE Transactions on Electromagnetic Compatibility, IEEE Service Center, New York, NY, vol. EMC-10, No. 2, May 1, 1982, pp. 225-237.

Apra M et al, Lightning Indirect Effects Certification of a Transport Aircraft by Numerical Simulations, IEEE Transactions on Electromagnetic Compatibility, IEEE Service Center, New York, NY, vol. 50, No. 3, Aug. 1, 2008, pp. 513-523.

Larsson Anders, The interaction between a lightning flash and an aircraft in flight, C.R. Physique, Jan. 1, 2002, pp. 1423-1444.

Yanchao Duan et al, Research on aircraft radome lightning protection based on segmented diverter strips, 2017 International Symposium on Electromagnetic Compatibility—EMC Europe, IEEE, Sep. 4, 2017, pp. 1-6.

* cited by examiner

MODELING NEW DESIGNS FOR ELECTROMAGNETIC EFFECTS

TECHNICAL FIELD

The disclosure relates to design modeling in general, and in particular, to modeling new designs for electromagnetic effects.

BACKGROUND

Multidisciplinary analysis and optimization is used to study a variety of airplane architectures and design decisions. Many disciplines are incorporated into the optimization, except electromagnetic effects considerations and coupling of the electromagnetic effects to structural performance considerations. At present, the electromagnetic effects analysis takes a considerable amount of time and so lags behind the structural analysis. Accordingly, those skilled in the art continue with research and development efforts in the field of modeling designs for electromagnetic effects.

SUMMARY

A method for modeling a new design for electromagnetic effects is provided herein. The method includes identifying, with a model based system engineering tool executed in a computer, an area of interest in the new design where a lightning strike may occur. The new design includes a plurality of structural features and a plurality of electromagnetic features. The method further includes generating, with an electromagnetic effects solver tool and a structural solver tool, a design model for the area of interest in the new design, extracting a plurality of design parameters from the design model, and generating a reduced order model by processing the plurality of design parameters, one or more of a plurality of test results, and one or more of a plurality of simulation results with a modeling tool. The reduced order model couples the plurality of structural features with the plurality of electromagnetic features. The plurality of test results is determined by tests of a plurality of known designs that are similar to the new design. The plurality of simulation results is determined by simulations of a plurality of known models that are similar to the new design. The method further includes storing the reduced order model in a storage medium that is readable by a statistical modeling tool.

In one or more embodiments of the method, the reduced order model includes one or more of an algebraic model, an ordinary differential equation model, and a partial differential equation model compatible with the statistical modeling tool.

In one or more embodiments of the method, the electromagnetic effects solver tool and the structural solver tool are each a numerical modeling tool.

In one or more embodiments of the method, the statistical modeling tool is a multidisciplinary analysis and optimization tool.

In one or more embodiments of the method, the plurality of design parameters includes a peak power density in the area of interest due to the lightning strike, a peak electrical current in the area of interest due to the lightning strike, and a peak temperature in the area of interest due to the lightning strike.

In one or more embodiments of the method, the plurality of design parameters includes one or more fatigue margins in the area of interest, one or more stress margins in the area of interest, and one or more damage limits in the area of interest.

In one or more embodiments of the method, the generating of the design model includes predicting a power density at an edge of the new design due to the lightning strike based on the plurality of design parameters, predicting a damage to the new design due to the lightning strike based on the plurality of design parameters, and predicting an ignition hazard that originates from the new design due to the lightning strike based on the plurality of design parameters.

In one or more embodiments, the method includes increasing one or more weights of the plurality of simulation results where the plurality of known models corresponds to the plurality of test results.

In one or more embodiments of the method, the new design forms a portion of an apparatus.

In one or more embodiments of the method, the apparatus is an aircraft.

A method for modeling a new design for electromagnetic effects is provided. The method includes storing, in a memory circuit, a plurality of test results that is determined by tests of a plurality of known designs that are similar to the new design. The new design includes a plurality of structural features and a plurality of electromagnetic features. The method further includes storing a plurality of simulation results that is determined by simulations of a plurality of known models that are similar to the new design, extracting a plurality of design parameters from a design model of the new design in an area of interest where a lightning strike may occur, generating a reduced order model by processing the plurality of design parameters, one or more of the plurality of test results, and one or more of the plurality of simulation results with a modeling tool, wherein the reduced order model couples the plurality of structural features with the plurality of electromagnetic features, and storing the reduced order model in a storage medium suitable for use by a statistical modeling tool.

In one or more embodiments of the method, the reduced order model includes one or more of an algebraic model, an ordinary differential equation model, and a partial differential equation model compatible with the statistical modeling tool.

In one or more embodiments of the method, the statistical modeling tool is a multidisciplinary analysis and optimization tool.

In one or more embodiments, the method includes parsing the plurality of test results and the plurality of simulation results among a plurality of training results, a plurality of validation results, and a plurality of testing data.

In one or more embodiments, the method includes generating a map of a parameter space populated by the plurality of test results and the plurality of simulation results.

In one or more embodiments of the method, the new design forms a portion of an aircraft.

In one or more embodiments, the method includes identifying, with a model based system engineering tool executed in a computer, the area of interest in the new design where the lightning strike may occur, and generating, with an electromagnetic effects solver tool and a structural solver tool, the design model for the area of interest in the new design.

A system is provided. The system includes a memory circuit and a processor. The memory circuit is configured to store a plurality of test results and a plurality of simulation results. The plurality of test results is determined by testing a plurality of known designs that are similar to a new design.

The plurality of simulation results is determined by simulating a plurality of known models that are similar to the new design. The new design includes a plurality of structural features and a plurality of electromagnetic features. The processor is configured to identify an area of interest in the new design where a lightning strike may occur, generate a design model for the area of interest in the new design with an electromagnetic effects solver tool and a structural solver tool, extract a plurality of design parameters from the design model, and generate a reduced order model by processing the plurality of design parameters, one or more of the plurality of test results, and one or more of the plurality of simulation results with a modeling tool. The reduced order model couples the plurality of structural features with the plurality of electromagnetic features. The processor is further configured to store the reduced order model in a storage medium that is readable by a statistical modeling tool.

In one or more embodiments of the system, the reduced order model includes one or more of an algebraic model, an ordinary differential equation model, and a partial differential equation model compatible with the statistical modeling tool, and the statistical modeling tool is a multidisciplinary analysis and optimization tool.

In one or more embodiments of the system, the new design forms a portion of an aircraft.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the disclosure generally provide a technique for modeling new designs for electromagnetic effects. Finite element modeling capabilities for the electromagnetic effects and structures are coupled and integrated into a model based engineering architecture. A wide database of known models and supplemental test data is accessible in the model based engineering architecture and may be used to extract key parameters into a database. The database subsequently feeds a modeling tool to create a reduced order model. The reduced order model is used by a multidisciplinary analysis and optimization technique to take into account the electromagnetic effects and/or the electromagnetic effects as coupled to the structures. The integration of the finite element modeling capabilities for electromagnetic effects and structures into the model based engineering architecture may be useful in the design of an aircraft. The use of the model based engineering may predict where a lightning strike is likely to occur, identify risk areas, predict the damage in the structure, and determine residual strength of vulnerable components, such as fasteners and structural joints.

Figure 1:
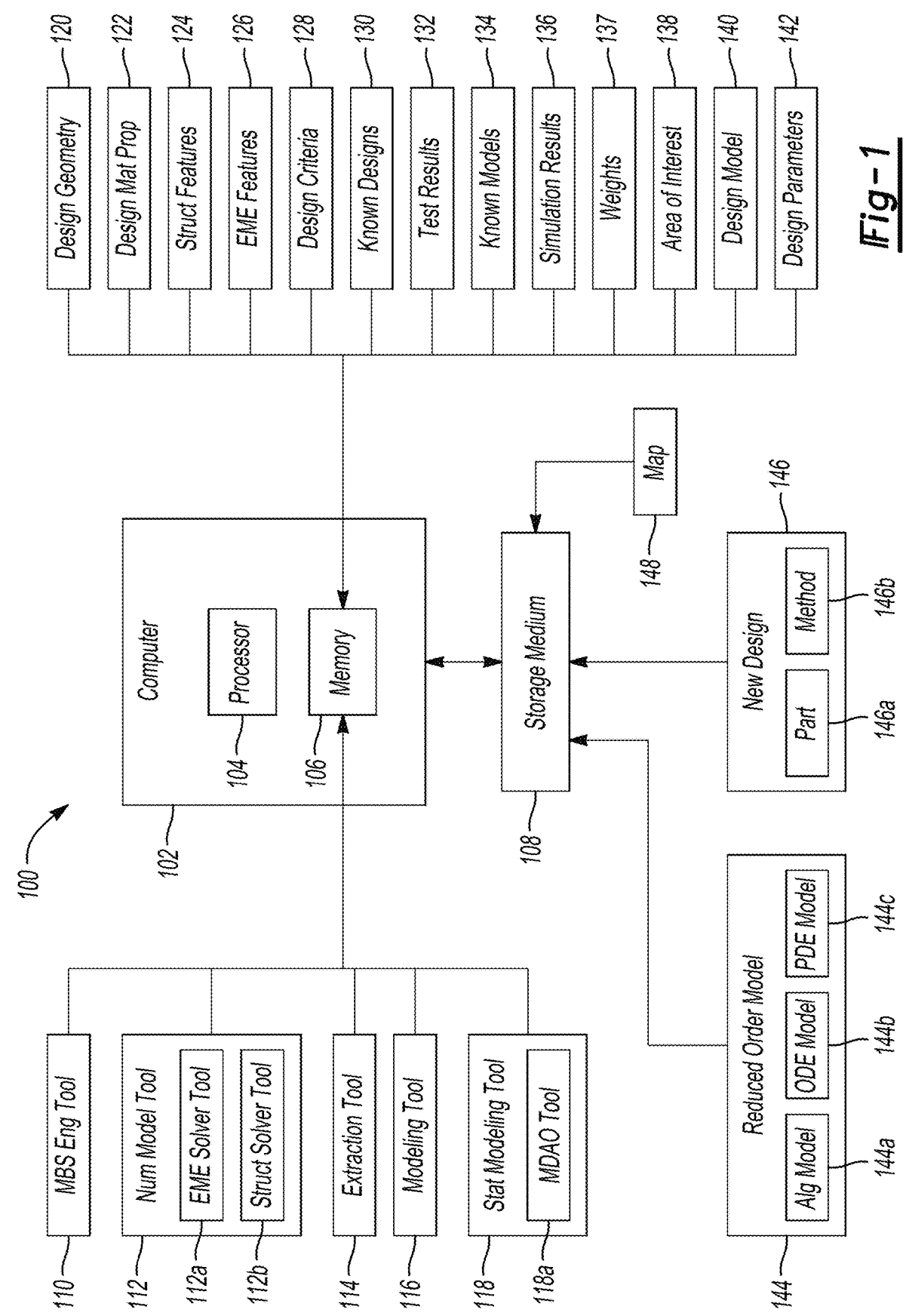
FIG. 1 is a schematic diagram illustrating a context of a system in accordance with one or more exemplary embodiments.

Referring to FIG. 1, a schematic diagram illustrating a context of a system 100 is shown in accordance with one or more exemplary embodiments. The system 100 generally includes a computer 102 having one or more processors 104 (one shown) and one or more memory circuits 106 (one shown), and one or more storage mediums 108 (one shown).

The system 100 implements a design system. The system 100 is operational to support the development of new designs for parts and installation methods for a variety of machines that are subjected to electromagnetic effects. The machines may include ground vehicles, aircraft, space vehicles, water vehicles, buildings, and the like. The electromagnetic effects include lightning strikes, electrostatic discharges, and high energy radio wave exposure.

The computer 102 implements one or more data processing computers. In embodiments with multiple computers 102, the individual computers 102 are coupled together to share data, memory space, and processing resources. The computer 102 is operational to store the design data and execute software tools used to model, simulate, and create the new designs.

The processor 104 implements one or more processors within the computer 102. The processor 104 is in communication with the memory circuit 106 and the storage medium 108 to exchange commands and data. The processor 104 is operational to execute the software tools used to create the new designs.

The memory circuit 106 implements one or more computer readable storage devices (e.g., random access memory, read-only memory, magnetic hard drives, solid-state drives, etc.). The memory circuit 106 stores software programs (or tools) that are executed by the processor 104, and design data for one or more known designs, simulation results, known models, test results, and associated data. The tools may include, but are not limited to a model based system (MBS) engineering tool 110, multiple numerical modeling tools 112 (including an electromagnetic effects (EME) solver tool 112a and a structural solver tool 112b), an extraction tool 114, a modeling tool 116, and a statistical modeling tool 118 (e.g., a multidisciplinary design and optimization (MDAO) tool 118a). In various embodiments, the tools 110-118a may be standard design tools. The design data may include, but is not limited to, design geometries 120, design material properties 122, structural features 124, electromagnetic features 126, design criteria 128, known designs 130, test results 132, known models 134, simulation results 136, a set of weights 137, an area of interest 138 in the new design, a design model 140, and design parameters 142. In various embodiments, the memory circuit 106 may implement volatile memory. In other embodiments, the memory circuit 106 may implement nonvolatile (e.g., non-transitory) memory. In still other embodiments, the memory circuit 106 may implement a combination of volatile memory and nonvolatile memory.

The storage medium 108 implements one or more non-transitory nonvolatile computer readable memory devices. The storage medium 108 is operational to store a reduced order model 144, a new design 146, and a map of a parameter space 148. The new design 146 may be a design of a part 146a and/or a design of an installation method 146b. In various embodiments, the storage medium 108 may be external to the computer 102 (as illustrated) or internal to the computer 102. The reduced order model 144 may include one or more of an algebraic model 144a, an ordinary differential equation model 144b, and a partial differential equation model 144c that are compatible with the statistical modeling tool 118. The reduced order model 144 may be suitable for use by the statistical modeling tool 118.

Figure 2:
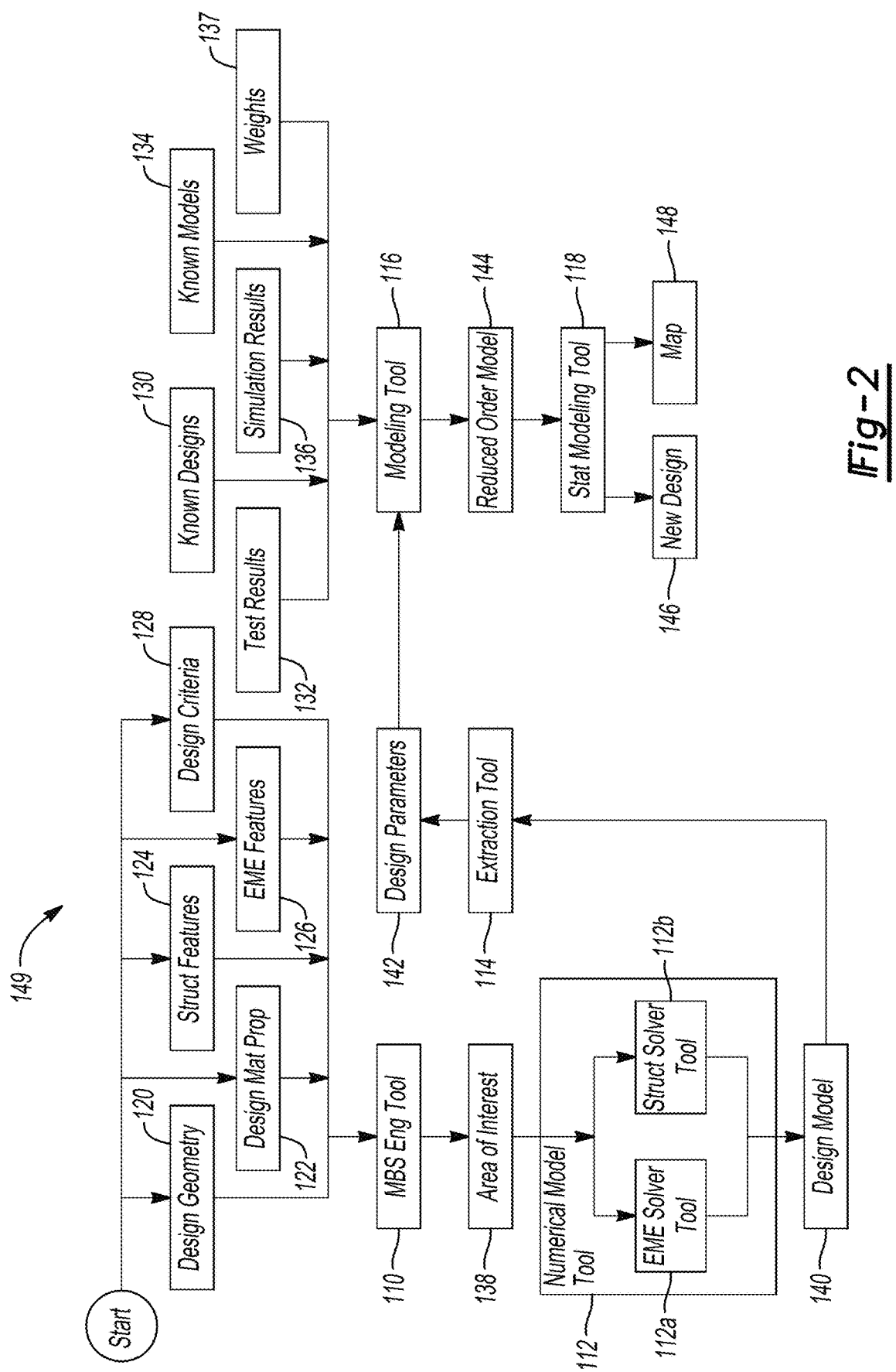
FIG. 2 is a schematic diagram of a modeling architecture implemented within the system in accordance with one or more exemplary embodiments.

Referring to FIG. 2, a schematic diagram of an example modeling architecture 149 implemented within the system 100 is shown in accordance with one or more exemplary embodiments. The modeling architecture 149 generally includes the model based system engineering tool 110 numerical modeling tools 112 (including the electromagnetic effects solver tool 112a and the structural solver tool 112b), the extraction tool 114, the modeling tool 116, and the statistical modeling tool 118. The modeling architecture also includes the design geometries 120, the design material properties 122, the structural features 124, the electromagnetic features 126, the design criteria 128, the known designs 130, the test results 132, the known models 134, the simulation results 136, the weights 137, the area of interest 138, the design model 140, the design parameters 142, the reduced order model 144, the new design 146, the map of the parameter space 148.

Data for the new design 146, test results from previously tested designs, simulation results from previously modeled designs, and associated data may be stored in a database and subsequently provided to the model based system engineering tool 110. The model based system engineering tool 110 utilizes the received data to determine the area of interest 138 where an electromagnetic disturbance is likely to occur. The electromagnetic effects solver tool 112a and the structural solver tool 112b may analyze the data in the area of interest 138 to create a design model 140. The design model 140 includes the structural characteristics and the electromagnetic characteristics coupled together. The extraction tool 114 extracts the design parameters 142 that are subsequently provided to the modeling tool 116.

The modeling tool 116 also received the test results 132 and the simulation results 136. Based on the design parameters 142, the test results 132 and the simulation results 136, the modeling tool 116 generates a reduced order model 144. The reduced order model 144 is processed by the statistical modeling tool 118. The statistical modeling tool 118 may generate the new design 146, and the map of the parameter space 148. The map of the parameter space 148 is useful to determine where future models, future simulation data, and/or future test results would be beneficial in support of other new designs.

Figure 3:
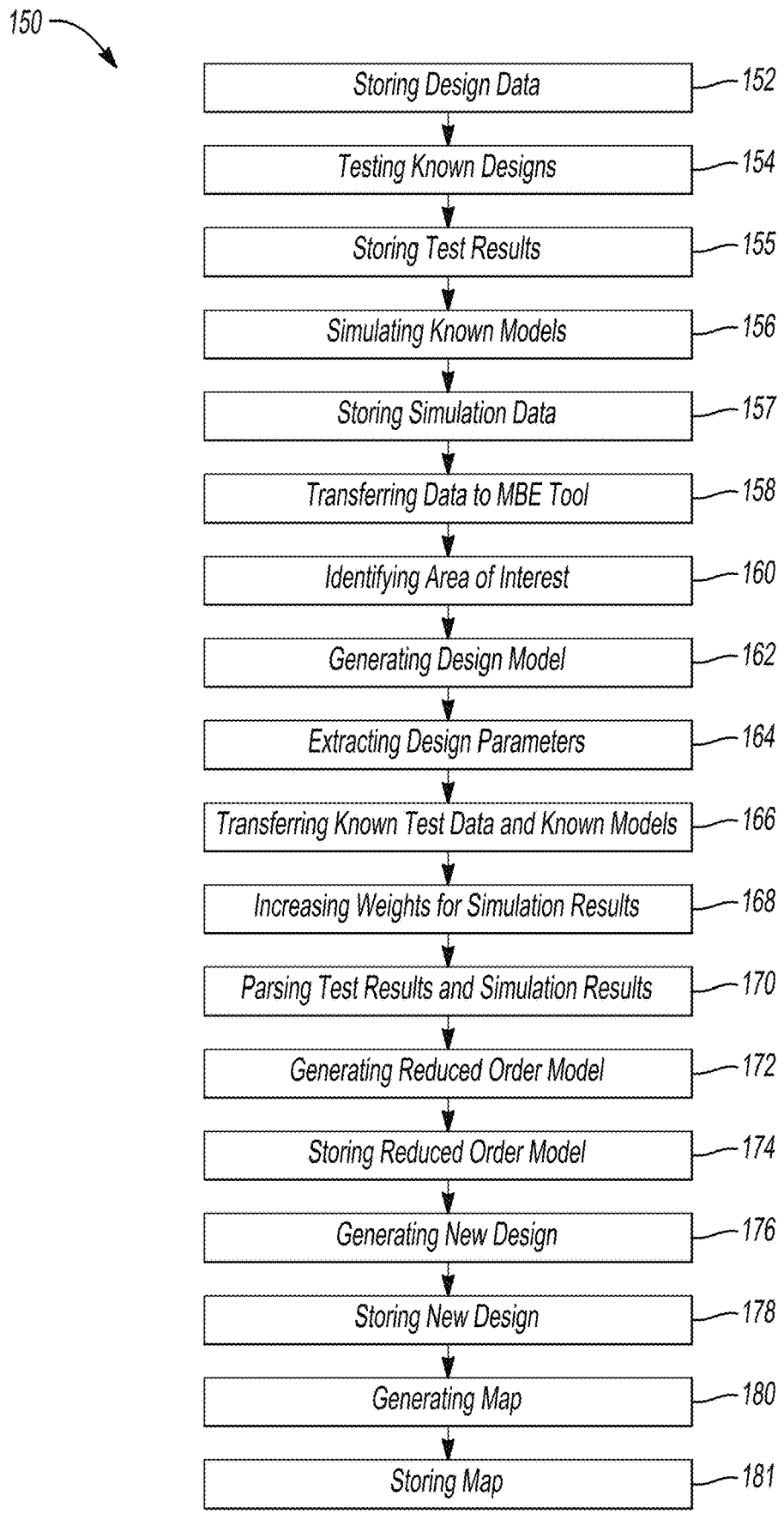
FIG. 3 is a flow diagram of a method for modeling new designs for electromagnetic effects in accordance with one or more exemplary embodiments.

Referring to FIG. 3, a flow diagram of an example implementation of a method 150 for modeling new designs for electromagnetic effects is shown in accordance with one or more exemplary embodiments. The method (or process) 150 is implemented by the system 100. The method 150 includes steps 152 to 181, as shown. The sequence of steps is shown as a representative example. Other step orders may be implemented to meet the criteria of a particular application.

In the step 152, the design data may be stored in the memory circuit 106. Additional data may be generated in the step 154 by testing known designs 130 to generate test results 132 that are subsequently stored in the step 155. More data may be generated in the step 156 by simulating known models 134 to generate simulation results 136 that are also stored in the memory circuit 106 in the step 157. Data appropriate for the development of a new design 146 may be transferred in the step 158 to the model based system engineering tool 110.

In the step 160, the model based system engineering tool 110 identifies an area of interest 138 in the new design 146. The area of interest 138 may be a location where an electromagnetic disturbance (e.g., a lightning strike) is likely to occur. The numerical modeling tools 112 subsequently generate in the step 162 a design model 140 for the area of interest 138 in the new design 146. One or more design parameters 142 are extracted from the design model 140 in the step 164 by the extraction tool 114.

In the step 166, the test results 132 and the know models 134 that are similar in nature to the new design 146 may be transferred to the modeling tool 116. Before, during, or after the transfer, one or more weights of the simulation results 136 may be increased in the step 168 where the simulation results 136 are related to known models 134 similar to the new design 146. The test results 132 and the simulation results 136 may be parsed in the step 170 among one or more training results, one or more validation results, and one or more sets of testing data.

In the step 172, the modeling tool 116 (e.g., a machine learning tool, a neural network tool, an artificial intelligence tool, or the like) may generate the reduced order model 144. The modeling tool 116 is trained by the simulation results 136 and the test results 132 from existing models and designs similar to the new design under consideration. The modeling tool 116 may expand the design parameters 142 based on the training. The reduced order model 144 is subsequently stored in the storage medium 108 in the step 174. The reduced order model 144 may be an ordered model. A format of the reduced order model 144 may be configured to feed into the statistical modeling tool 118 being used in the method 150. The statistical modeling tool 118) generates the new design 146 in the step 176. The new design 146 is stored in the storage medium 108 in the step 178. A map of the parameter space 148 may also be generated by the statistical modeling tool 118 in the step 180 and stored in storage medium 108 in the step 181.

In various embodiments, the method 150 may be performed as a single cycle. The resulting reduced order model 144 and/or the new design 146 may subsequently be evaluated. If appropriate, the method 150 may be repeated one or more times until the intended results are obtained.

Figure 4:
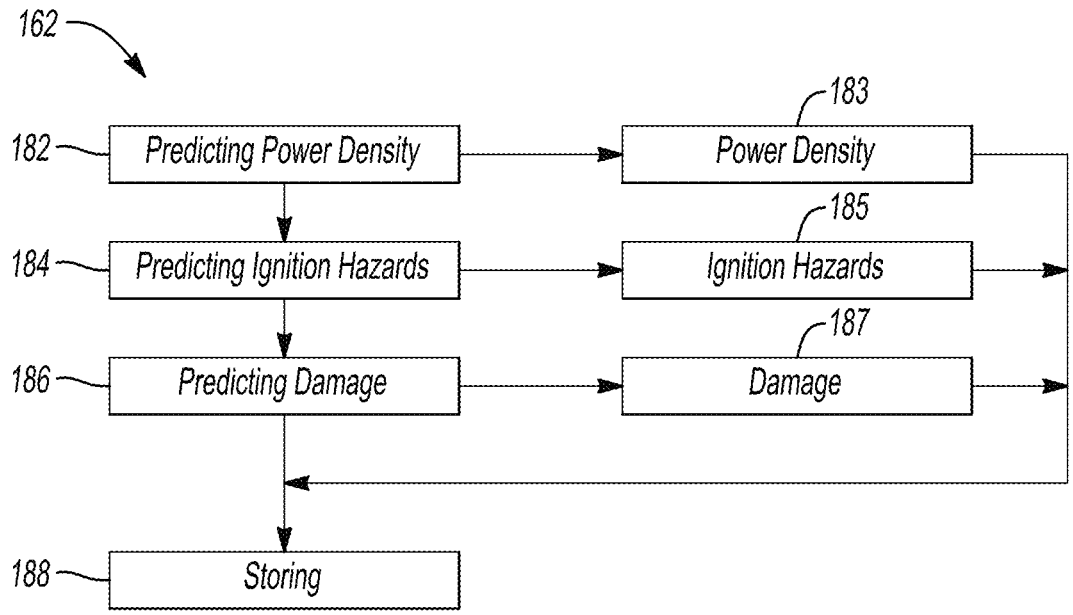
FIG. 4 is a flow diagram for generating a design model in accordance with one or more exemplary embodiments.

Referring to FIG. 4, a detailed flow diagram of an example implementation of the step 162 for generation of the design model is shown in accordance with one or more exemplary embodiments. The step 162 generally includes steps 182, 184, 186, and 188, as shown. The sequence of steps is shown as a representative example. Other step orders may be implemented to meet the criteria of a particular application.

In the step 182, the numerical modeling tools 112 may predict a power density 183 at an edge of the new design 146 due to the electromagnetic disturbance (e.g., a lightning strike) based on the design parameters 142. The numerical modeling tools 112 may predict, in the step 184, an ignition hazard 185 that originates from the new design 146 due to the electromagnetic disturbance based on the design parameters 142. In the step 186, the numerical modeling tools 112 predict a damage 187 to the new design 146 due to the electromagnetic disturbance also based on the design parameters 142. The power density 183, the ignition hazard 185, and the damage 187 are stored as part of the design model 140 in the step 188.

Figure 5:
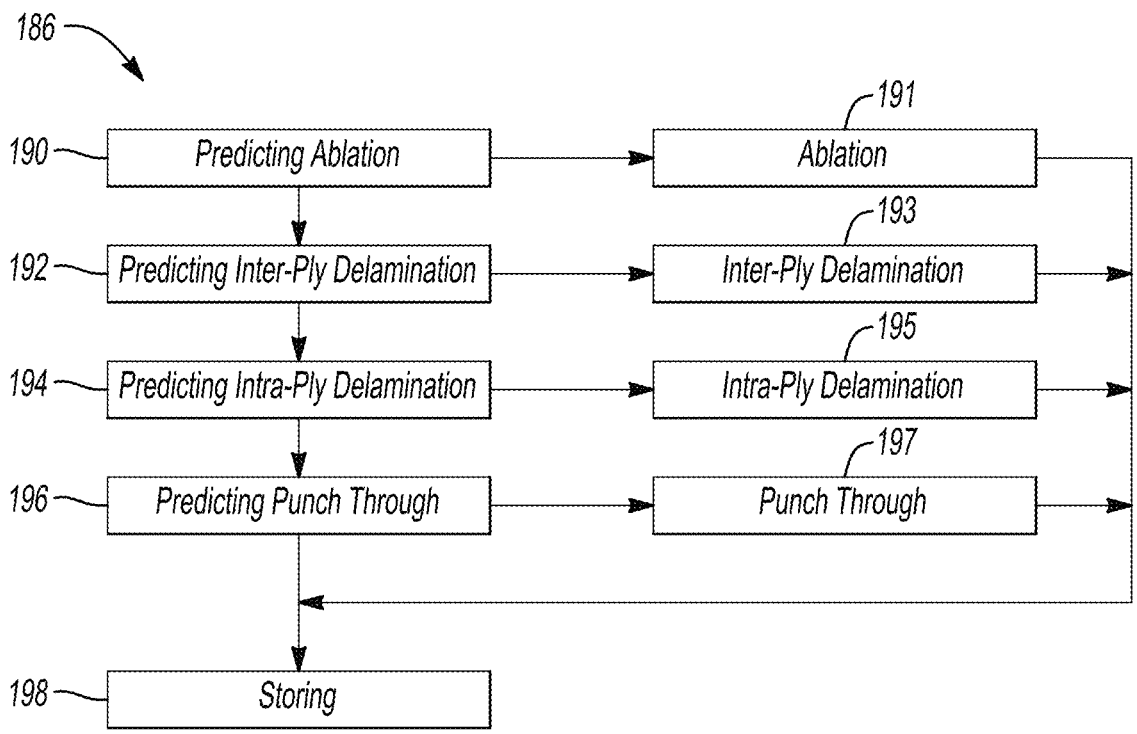
FIG. 5 is a flow diagram for predicting damage in accordance with one or more exemplary embodiments.

Referring to FIG. 5, a detailed flow diagram of an example implementation of the step 186 for predicting the damage is shown in accordance with one or more exemplary embodiments. The step 186 generally includes steps 190, 192, 194, 196, and 198, as shown. The sequence of steps is shown as a representative example. Other step orders may be implemented to meet the criteria of a particular application.

In the step 190, an ablation 191 due to the electromagnetic disturbance (e.g., a lightning strike) may be predicted by the numerical modeling tools 112. Inter-ply delamination 193 due to the electromagnetic disturbance may be predicted by the numerical modeling tools 112 in the step 192. In the step 194, an intra-ply delamination 195 may be predicted due to the electromagnetic disturbance. Punch through 197 caused by the electromagnetic disturbance may be predicted in the step 196. In the step 198, the ablation 191, the inter-ply delamination 193, the intra-ply delamination 195, and the punch through 197 may be stored as part of the design model 140.

Figure 6:
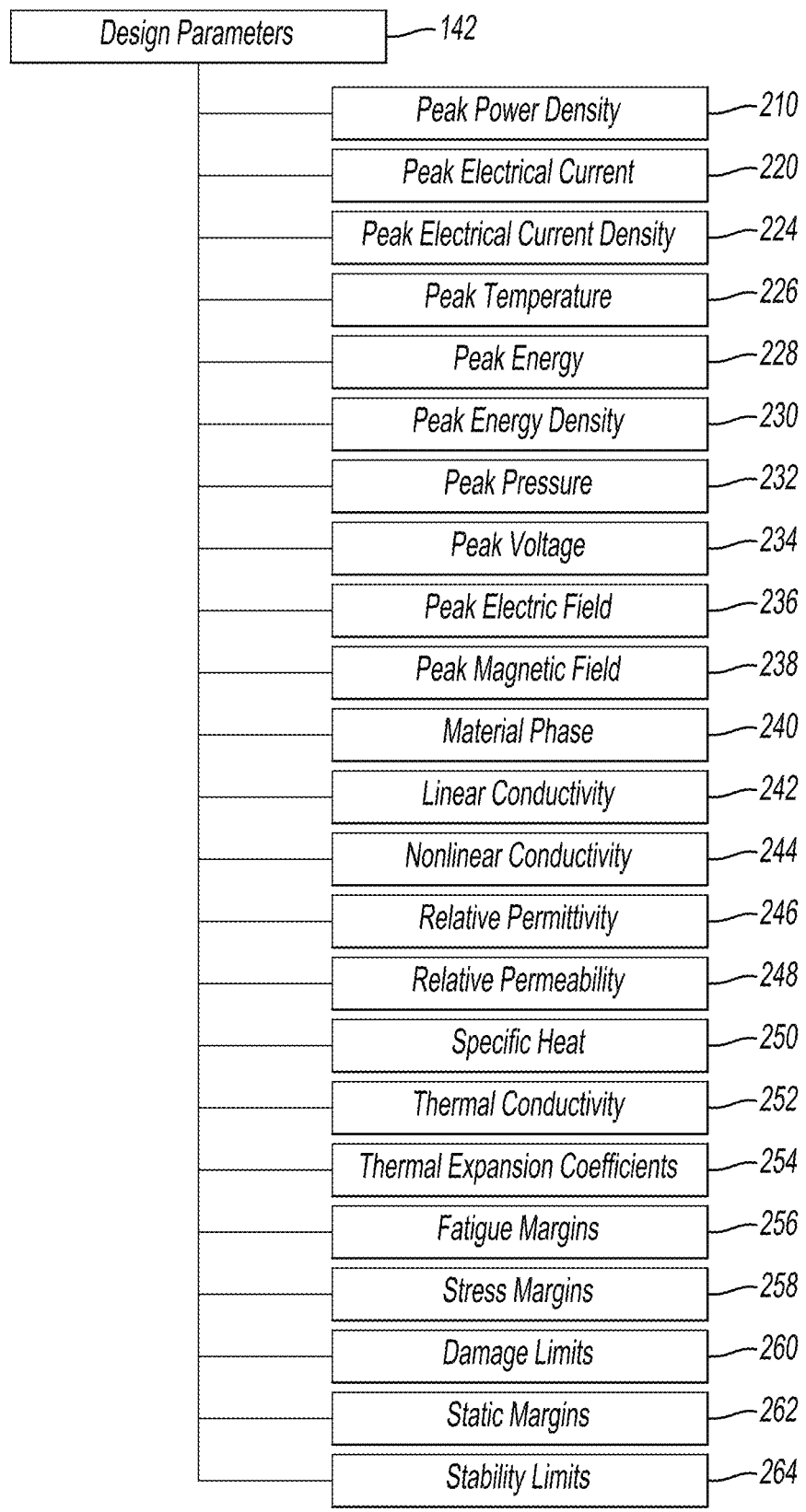
FIG. 6 is a list of design parameters of the design model in accordance with one or more exemplary embodiments.

Referring to FIG. 6, a list of an example design parameters extracted from the design model 140 is shown in accordance with one or more exemplary embodiments. The design parameters 142 may include a peak power density 210, a peak electrical current 220, a peak electrical current density 224, a peak temperature 226, a peak energy 228, a peak energy density 230, a peak pressure 232, a peak voltage 234, a peak electric field 236, and/or a peak magnetic field 238. The design parameters 142 may also include a material phase 240, a linear conductivity 242, a nonlinear conductivity 244, a relative permittivity 246, and/or a relative permeability 248. Additional design parameters 142 may include a specific heat 250, a thermal conductivity 252, a thermal expansion coefficients 254, fatigue margins 256, stress margins 258, damage limits 260, static margins 262, and/or stability limits 264.

Figure 7:
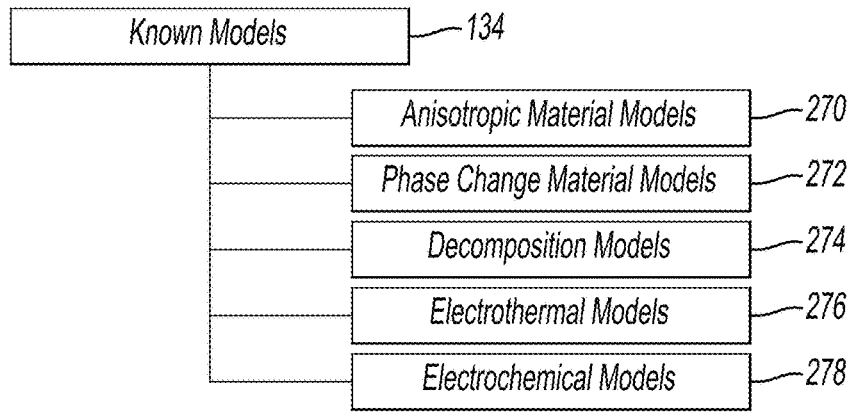
FIG. 7 is a list of model types in accordance with one or more exemplary embodiments.

Referring to FIG. 7, a list of known model types is shown in accordance with one or more exemplary embodiments. The known models 134 include one or more of anisotropic materials models 270, phase change material models 272, decomposition models 274, electrothermal models 276, and electrochemical models 278.

Figure 8:
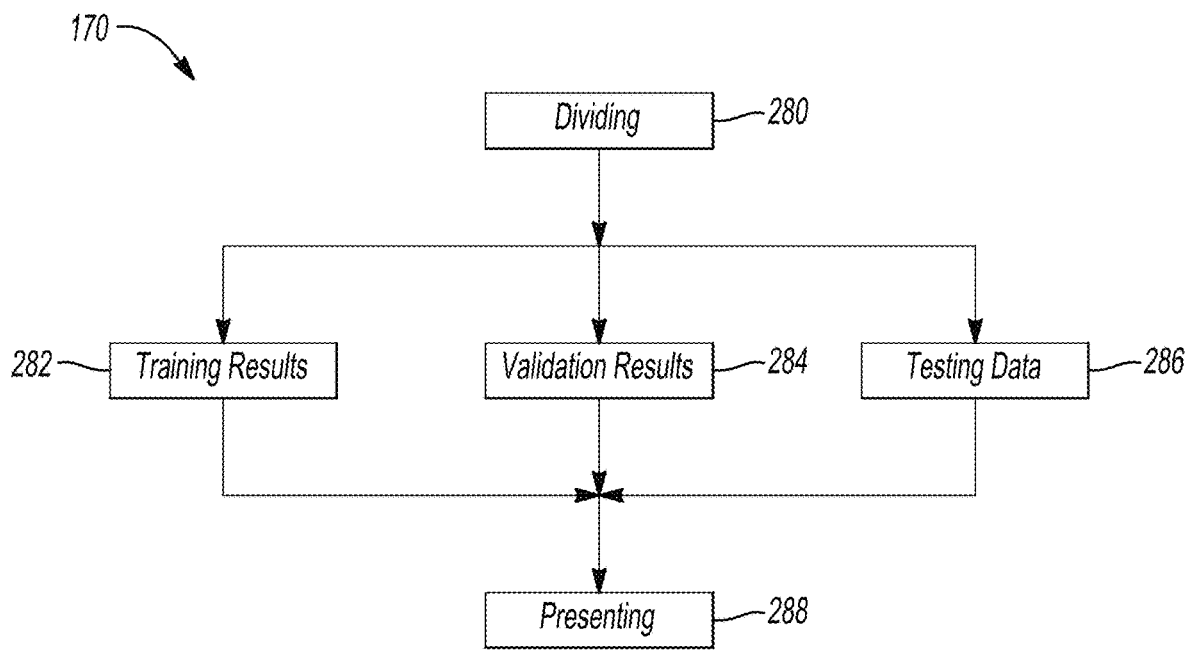
FIG. 8 is a flow diagram for parsing test results and simulation results in accordance with one or more exemplary embodiments.

Referring to FIG. 8, a flow diagram of an example implementation of the step 170 for parsing the test results 132 and the simulation results 136 is shown in accordance with one or more exemplary embodiments. The step 170 generally includes steps 280 and 288. The sequence of steps is shown as a representative example. Other step orders may be implemented to meet the criteria of a particular application.

In the step 280, the test results 132 and the simulation results 136 may be divided among training results 282, validation results 284, and testing data 286. Each of the training results 282, validation results 284, and testing data 286 may subsequently be presented to the modeling tool 116 in the step 288.

Figure 9:
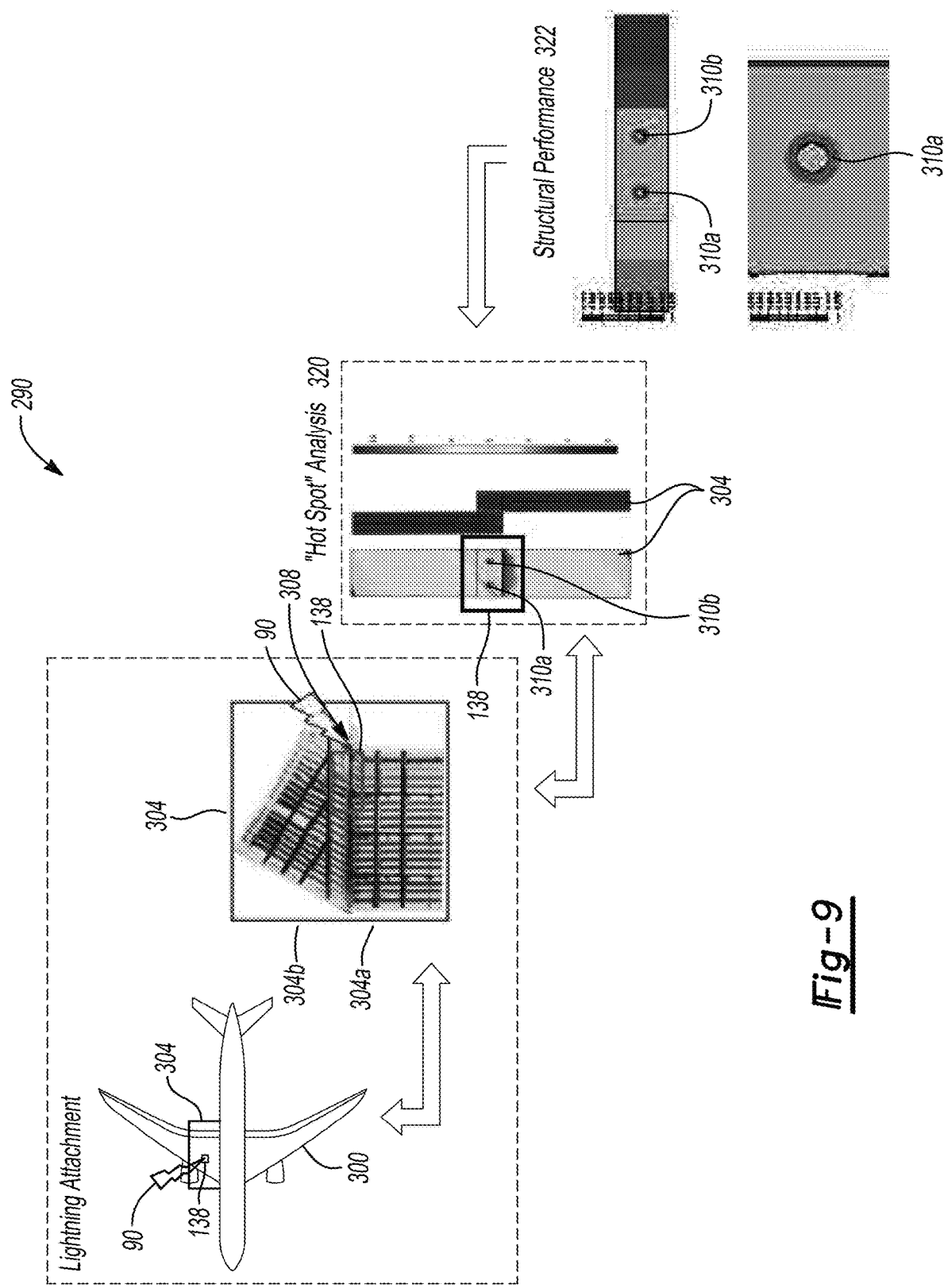
FIG. 9 is a schematic diagram of a digital framework in accordance with one or more exemplary embodiments.

Referring to FIG. 9, a schematic diagram of an example digital framework 290 to predict performance is shown in accordance with one or more exemplary embodiments. The digital framework 290 may use the model based system engineering tool 110 to predict an area of interest 138 where a lightning strike 90 is likely to occur, identify risk areas, predict damage in the structure, and determine residual strength. As illustrated, the lightning strike 90 may hit an apparatus 304 that forms a portion of an aircraft 300. The apparatus 304 may have multiple components 304a-304b with the lightning strike 90 hitting along an edge 308 of the apparatus 304.

The area of interest 138 may further undergo a "hot spot" analysis 320 by the electromagnetic effects solver tool 112a and the structural solver tool 112b. For example, the hot spot analysis 320 may concern fasteners 310a-310b that connect the components 304a-304b of the apparatus 304 together at a joint. The hot spot analysis 320 may determine the allowables, the fatigue margins 256, the stress margins 258, power density 183, peak electrical current 220, peak temperature 226, damage 187, and other parameters of the apparatus 304, method of installing the apparatus 304, and/or the aircraft 300.

A structural performance analysis 322 may be performed based on the results of the hot spot analysis 320. The structural performance analysis 322 generally determines ignition source prediction and containment failures from mechanical forces.

Figure 10:
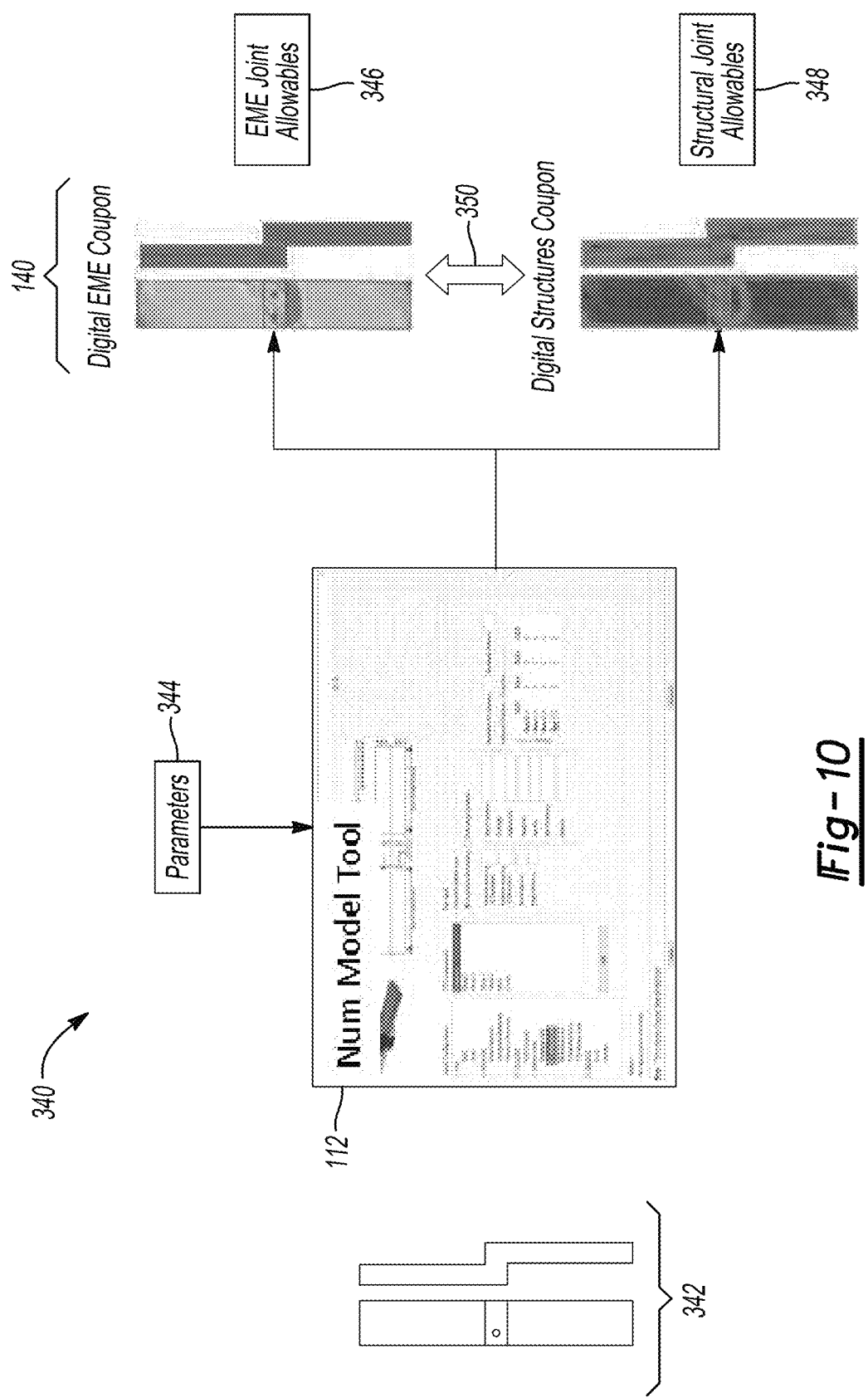
FIG. 10 is a schematic diagram of a joint analysis in accordance with one or more exemplary embodiments.

Referring to FIG. 10, a schematic diagram of an example implementation of a joint analysis 340 is shown in accordance with one or more exemplary embodiments. The joint analysis 340 may be used to evaluate joints in the new design 146. The analysis includes gathering a list of known joint types 342 from the known designs 130 and/or the known models 134. Parameters 344 related to the known joint types 342 may be gathered from the known designs 130 and/or the known models 134. The parameters 344 may include, but are not limited to, fastener diameters, ply thicknesses, numbers of fasteners, secondary containment criteria, connectivity enhancements, ultimate lightning load, and economic lightning damage load. Other parameters 344 may be used to meet the design criteria of a particular application.

The known joint types 342 and the parameters 344 may be processed by the numerical modeling tools 112 to generate the design model 140. The design model 140 may include electromagnetic joint allowables 346 and structural joint allowables 348. A model interface/coupling 350 between the electromagnetic joint allowables 346 and structural joint allowables 348 may be included in the design model 140. The model interface/coupling 350 may include, but is not limited to, pressure, temperature, heat affected zones, and containment breaches.

For the electromagnetic effects, the numerical modeling tools 112 may be used to predict the power density at the edge of a composite panel and compare the results to the values established to cause edge glow. Furthermore a coupled electromagnetic effect/structures model may be used to predict when a fastener/structure interface dissipates a sufficient amount of energy due to contact resistance and so breaches the containment and releases potential ignition hazards. This design may then be compared with a known design that has a secondary containment features, such as a cap seal.

Figure 11:
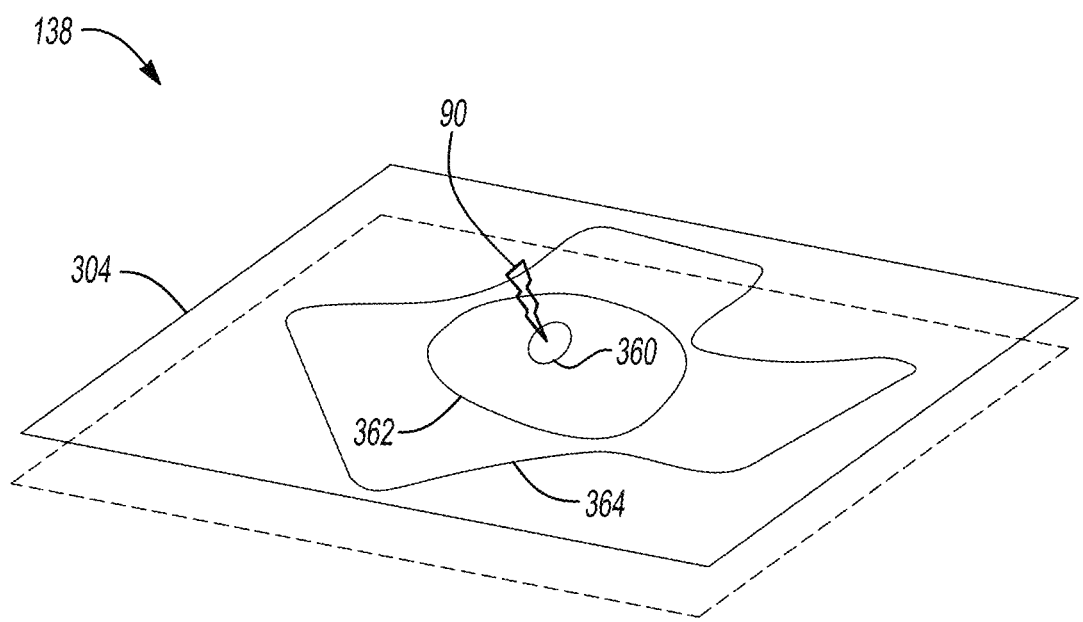
FIG. 11 is a perspective diagram of an area of interest hit by a lightning strike in accordance with one or more exemplary embodiments.

Referring to FIG. 11, a perspective diagram of an example area of interest 138 hit by a lightning strike 90 is shown in accordance with one or more exemplary embodiments. The apparatus 304 may have visible surface damage 360 where the apparatus 304 incurred the lightning strike 90. The lightning strike 90 may create subsurface damage 362 around the visible surface damage 360. Heating from the lightning strike 90 may spread beyond the subsurface damage 362 into a wider volume 364 of the apparatus 304.

Embodiments of the disclosure may generate a database of run models that includes test results from existing designs and simulation results from existing models. For a new design, the database may be searched for similar existing designs and/or similar existing models to provide background information. The new design and the background information are processed in parallel by both the electromagnetic effects solver tool 112a and the structural solver tool 112b to create the design model 140. The design parameters 142 are extracted from the design model 140 and subsequently feed into the modeling tool 116. The modeling tool 116 may be a machine learning tool, a neural network tool, an artificial intelligence tool, or the like.

The extraction tool 114 and the modeling tool 116 may transform the design model 140 into the reduced order model 144. In various embodiments, the reduced order model 144 may define algebraic equations for the new design 146. The coefficient of the algebraic equations may be optimized by the modeling tool 116. Extra weight may be given to the known models 134 that correspond to experimentally known test results 132.

The reduced order model 144 may be transferred into the statistical modeling tool 118 to optimize a layout of the apparatus 304 and/or the aircraft 300. The statistical modeling tool 118 may generate the map of the parameter space 148 to show where the database is sparsely populated and suggest new model builds and further test known designs.

The techniques disclosed are useful in evaluating the allowables for electromagnetic effects and structures. The techniques may be integrated into a model based engineering digital thread to allow simultaneous and cross discipline effects to be captured more readily. The model based engineering environment also allows for the generation of a comprehensive database that houses the results from the simulations as well as existing and future test results that support, validate, and supplement the finite element modeling. The database of test data and models may subsequently be used to extract specifics of the new design. The extraction may be done either manually or by model querying techniques and then applied to the finite element models and well as computer aided design and other models of the experimental tests. The collection of parameters generally grows and evolves over time.

The database of parameters is regularly fed into the modeling tool 116 (e.g., machine learning tools, neural network tools, artificial intelligence tools, etc.) to create and optimize the reduced order model (e.g., algebraic equations, ordinary differential equations, and/or partial differential equations). The database of parameters may be split between training, validation, and testing data. The split may be 50%, 40%, and 10% respectively. Extra weight is given to models that have been validated by test. The map of the parameter space 148 will also inform requests for future models to be built. Finally the reduced order model 144 may be available to the statistical modeling tool 118 to take the electromagnetic effects and electromagnetic effects/structures coupled performance into account and give weight in the overall architecture of the new design 146.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for modeling a new design of a portion of an apparatus for electromagnetic effects comprising:

identifying, with a model based system engineering tool executed in a computer, an area of interest in the new design where a lightning strike may occur, wherein the new design includes a plurality of structural features and a plurality of electromagnetic features;

generating, with an electromagnetic effects solver tool and a structural solver tool, a design model for the area of interest in the new design, wherein the generating of the design model includes:

predicting a power density at an edge of the new design due to the lightning strike based on a plurality of design parameters;

predicting a damage to the new design due to the lightning strike based on the plurality of design parameters, and predicting an ignition hazard that originates from the new design due to the lightning strike based on the plurality of design parameters;

extracting the plurality of design parameters from the design model in the area of interest;

generating a reduced order model by processing the plurality of design parameters, one or more of a plurality of test results, and one or more of a plurality of simulation results with a modeling tool, wherein the reduced order model couples the plurality of structural features with the plurality of electromagnetic features, the plurality of test results is determined by tests of a plurality of known designs that are similar to the new design, and the plurality of simulation results is determined by simulations of a plurality of known models that are similar to the design model; and storing the reduced order model in a storage medium that is readable by a statistical modeling tool, wherein the reduced order model is used by the statistical modeling tool to include the electromagnetic effects as coupled to a structure of the apparatus to ensure that the new design is within one or more acceptable manufacturing tolerances.

2. The method according to claim 1, wherein the reduced order model includes one or more of an algebraic model, an ordinary differential equation model, and a partial differential equation model compatible with the statistical modeling tool.

3. The method according to claim 1, wherein the electromagnetic effects solver tool and the structural solver tool are each a numerical modeling tool.

4. The method according to claim 1, wherein the statistical modeling tool is a multidisciplinary analysis and optimization tool.

5. The method according to claim 1, wherein the plurality of design parameters includes a peak power density in the area of interest due to the lightning strike, a peak electrical current in the area of interest due to the lightning strike, and a peak temperature in the area of interest due to the lightning strike.

6. The method according to claim 1, wherein the plurality of design parameters includes one or more fatigue margins in the area of interest, one or more stress margins in the area of interest, and one or more damage limits in the area of interest.

7. The method according to claim 1, further comprising:
increasing one or more weights of the plurality of simulation results where the plurality of known models corresponds to the plurality of test results.

8. The method according to claim 1, wherein the apparatus is a vehicle.

9. The method according to claim 1, wherein the apparatus is an aircraft.

10. A method for modeling a new design of a portion of an apparatus for electromagnetic effects comprising:
storing, in a memory circuit, a plurality of test results that is determined by tests of a plurality of known designs that are similar to the new design, wherein the new design includes a plurality of structural features and a plurality of electromagnetic features;
generating, with an electromagnetic effects solver tool and a structural solver tool, a design model for an area of interest in the new design, wherein the generating of the design model includes:
predicting a power density at an edge of the new design due to a lightning strike based on a plurality of design parameters;
predicting a damage to the new design due to the lightning strike based on the plurality of design parameters; and
predicting an ignition hazard that originates from the new design due to the lightning strike based on the plurality of design parameters;
storing a plurality of simulation results that is determined by simulations of a plurality of known models that are similar to the design model;

extracting the plurality of design parameters from the design model in the area of interest where the lightning strike may occur;

generating a reduced order model by processing the plurality of design parameters, one or more of the plurality of test results, and one or more of the plurality of simulation results with a modeling tool, wherein the reduced order model couples the plurality of structural features with the plurality of electromagnetic features; and storing the reduced order model in a storage medium suitable for use by a statistical modeling tool, wherein the reduced order model is used by the statistical modeling tool to include the electromagnetic effects as coupled to a structure of the apparatus to ensure that the new design is within one or more acceptable manufacturing tolerances.

11. The method according to claim 10, wherein the reduced order model includes one or more of an algebraic model, an ordinary differential equation model, and a partial differential equation model compatible with the statistical modeling tool.

12. The method according to claim 10, wherein the statistical modeling tool is a multidisciplinary analysis and optimization tool.

13. The method according to claim 10, further comprising:
parsing the plurality of test results and the plurality of simulation results among a plurality of training results, a plurality of validation results, and a plurality of testing data.

14. The method according to claim 10, further comprising:
generating a map of a parameter space populated by the plurality of test results and the plurality of simulation results.

15. The method according to claim 10, wherein the apparatus is an aircraft.

16. The method according to claim 10, further comprising:
identifying, with a model based system engineering tool executed in a computer, the area of interest in the new design where the lightning strike may occur.

17. A system for modeling a new design of a portion of an apparatus for electron agnetic effects comprising:
a memory circuit configured to store a plurality of test results and a plurality of simulation results, wherein
the plurality of test results is determined by testing a plurality of known designs that are similar to the new design,
the plurality of simulation results is determined by simulating a plurality of known models that are similar to a design model for an area of interest in the new design, and
the new design includes a plurality of structural features and a plurality of electromagnetic features; and
a processor configured to:
identify the area of interest in the new design where a lightning strike may occur;
generate the design model for the area of interest in the new design with an electromagnetic effects solver tool and a structural solver tool, wherein the generation of the design model includes:
predict a power density at an edge of the new design due to the lightning strike based on plurality of design parameters;

predict a damage to the new design due to the lightning strike based on the plurality of design parameters; and predict an ignition hazard that originates from the new design due to the lightning strike based on the plurality of design parameters;

extract the plurality of design parameters from the design model in the area of interest;

generate a reduced order model by processing the plurality of design parameters, one or more of the plurality of test results, and one or more of the plurality of simulation results with a modeling tool, wherein the reduced order model couples the plurality of structural features with the plurality of electromagnetic features; and store the reduced order model in a storage medium that is readable by a statistical modeling tool, wherein the reduced order model is used by the statistical modeling tool to include the electromagnetic effects as coupled to a structure of the apparatus to ensure that the new design is within one or more acceptable manufacturing tolerances.

18. The system according to claim 17, wherein:

the reduced order model includes one or more of an algebraic model, an ordinary differential equation model, and a partial differential equation model compatible with the statistical modeling tool.

19. The system according to claim 17, wherein the apparatus is an aircraft.

20. The system according to claim 17, wherein the statistical modeling tool is a multidisciplinary analysis and optimization tool.

* * * * *